United States Patent
Chen

(10) Patent No.: US 12,278,727 B2
(45) Date of Patent: Apr. 15, 2025

(54) PROCESSING CIRCUIT, NETWORK DEVICE AND PROCESSING METHOD FOR ANOMALY DETECTION

(71) Applicant: REALTEK SEMICONDUCTOR CORP., Hsinchu (TW)

(72) Inventor: Ching-Wei Chen, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 305 days.

(21) Appl. No.: 17/872,393

(22) Filed: Jul. 25, 2022

(65) Prior Publication Data
US 2023/0327944 A1 Oct. 12, 2023

(30) Foreign Application Priority Data
Apr. 6, 2022 (TW) .................................. 111113134

(51) Int. Cl.
*H04L 41/0654* (2022.01)
*H04L 41/0659* (2022.01)
*H04L 41/0677* (2022.01)

(52) U.S. Cl.
CPC ...... *H04L 41/0677* (2013.01); *H04L 41/0654* (2013.01); *H04L 41/0661* (2023.05)

(58) Field of Classification Search
CPC .. G06F 11/30; H04L 41/0654; H04L 41/0661; H04L 41/0677; H04L 43/0817
See application file for complete search history.

(56) References Cited

U.S. PATENT DOCUMENTS

| 8,077,762 | B2 | 12/2011 | Agazzi |
| 2012/0063295 | A1 | 3/2012 | Bliss |
| 2021/0232521 | A1* | 7/2021 | Kim .................... G06F 11/1441 |

FOREIGN PATENT DOCUMENTS

WO WO-2023276657 A1 * 1/2023

* cited by examiner

*Primary Examiner* — Melvin C Marcelo
*Assistant Examiner* — Natali Pascual Peguero
(74) *Attorney, Agent, or Firm* — Birch, Stewart, Kolasch & Birch, LLP

(57) ABSTRACT

A processing circuit, a network device, and a processing method for anomaly detection are provided. The network device includes a processing circuit and network ports. The processing circuit includes a physical layer (PHY) transmission unit, a PHY control unit, a state detection unit, and a reset unit. The processing circuit performs steps of: switching from operating in the first operation state to operating in a second operation state by the PHY control unit according to an operation request; obtaining a current operation state of the PHY control unit by the state detection unit; determining whether the current operation state and the second operation state are identical by the state detection unit; and driving the reset unit to reset the PHY control unit to an initial state if the current operation state and the second operation state are not identical.

9 Claims, 6 Drawing Sheets

PROCESSING CIRCUIT, NETWORK DEVICE AND PROCESSING METHOD FOR ANOMALY DETECTION

CROSS-REFERENCE TO RELATED APPLICATION

This non-provisional application claims priority under 35 U.S.C. § 119(a) to Patent Application No. 111113134 filed in Taiwan, R.O.C. on Apr. 6, 2022, the entire contents of which are hereby incorporated by reference.

BACKGROUND

Technical Field

The instant disclosure is related to a processing circuit, an electronic device, and a processing method, especially a processing circuit, a network device, and a processing method for anomaly detection.

Related Art

Many electronic devices are provided with connection ports to achieve peripheral device expansion or communication. In general, various connection ports are provided with physical layer (PHY) controllers for signal conversion. If an error occurs at a PHY controller, the user cannot directly observe the cause of the error from outside of the connection port. If an electronic device is connected to another device using a faulty connection port, issues such as file corruption and transmission denial may occur.

For an electronic device with multiple connection ports, if the PHY controller of one of the connection ports is faulty, the faulty connection port and its PHY controller should be reset. However, such a multi-port electronic device usually uses a single control chip connected to all its PHY controllers. As a result, resetting the PHY controller will affect the control chip and all the other PHY controllers.

SUMMARY

In view of the above, in some exemplary of the instant disclosure, the processing circuit for anomaly detection is applied to the resetting process of anomaly during network transmission.

In some exemplary embodiments, the processing circuit for anomaly detection comprises a physical layer (PHY) transmission unit, a physical layer control unit, a state detection unit, and a reset unit. The physical layer transmission unit is configured to receive an operation request; the physical layer control unit is connected to the physical layer transmission unit, wherein the physical layer control unit switches from operating in a first operation state to operating in a second operation state according to the operation request; the state detection unit is connected to the physical layer control unit, wherein the state detection unit is configured to detect a current operation state of the physical layer control unit, and the state detection unit outputs a warning signal when the current operation state and the second operation state are not identical; the reset unit is connected to the physical layer control unit and the state detection unit, wherein the reset unit transmits a reset signal to the physical layer control unit according to the warning signal to reset the physical layer control unit to an initial state. According to one or some exemplary embodiments of the present disclosure, the processing circuit for anomaly detection monitors the operation state of the physical layer control unit using an independent state detection unit and directly resets the monitored physical layer control unit when an error occurs.

In some exemplary embodiments, the state detection unit obtains at least one default operation state of the physical layer control unit according to the first operation state, and the physical layer control unit selects one of the at least one default operation state as the second operation state according to the operation request.

In some exemplary embodiments, a network device for anomaly detection comprises at least one network connection port and a processor. Each of the at least one network connection port comprises a physical layer transmission unit, a physical layer control unit, a state detection unit, and a reset unit. The physical layer control unit is connected to the physical layer transmission unit, the state detection unit, and the reset unit. The physical layer transmission unit is configured to receive an operation request. The physical layer control unit switches from operating in a first operation state to operating in a second operation state according to the operation request. The state detection unit is configured to detect a current operation state of the physical layer control unit. When the state detection unit determines that the current operation state and the second operation state are not identical, the state detection unit drives the reset unit to transmit a reset signal to the physical layer control unit to reset the physical layer control unit to an initial state. The processor is connected to the at least one network connection port, wherein the processor records an error record of a corresponding one of the at least one network connection port according to the reset signal.

In some exemplary embodiments, a processing method for anomaly detection comprises the following steps: receiving an operation request by a network device; switching from operating in a first operation state to operating in a second operation state by a physical layer control unit of the network device; obtaining a current operation state of the physical layer control unit by a state detection unit of the network device; determining if the current operation state and the second operation state are identical by the state detection unit; and driving a reset unit to transmit a reset signal to the physical layer control unit by the state detection unit to reset the physical layer control unit to an initial state if the current operation state and the second operation state are not identical.

According to one or some exemplary embodiments of the present disclosure, the processing circuit, network device, and processing method for anomaly detection can monitor the operation state of each physical layer control unit. When an error occurs at a physical layer control unit, the corresponding state detection unit and the corresponding reset unit reset the physical layer control unit, so that the operation state of the physical layer control unit is switched to the initial state.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
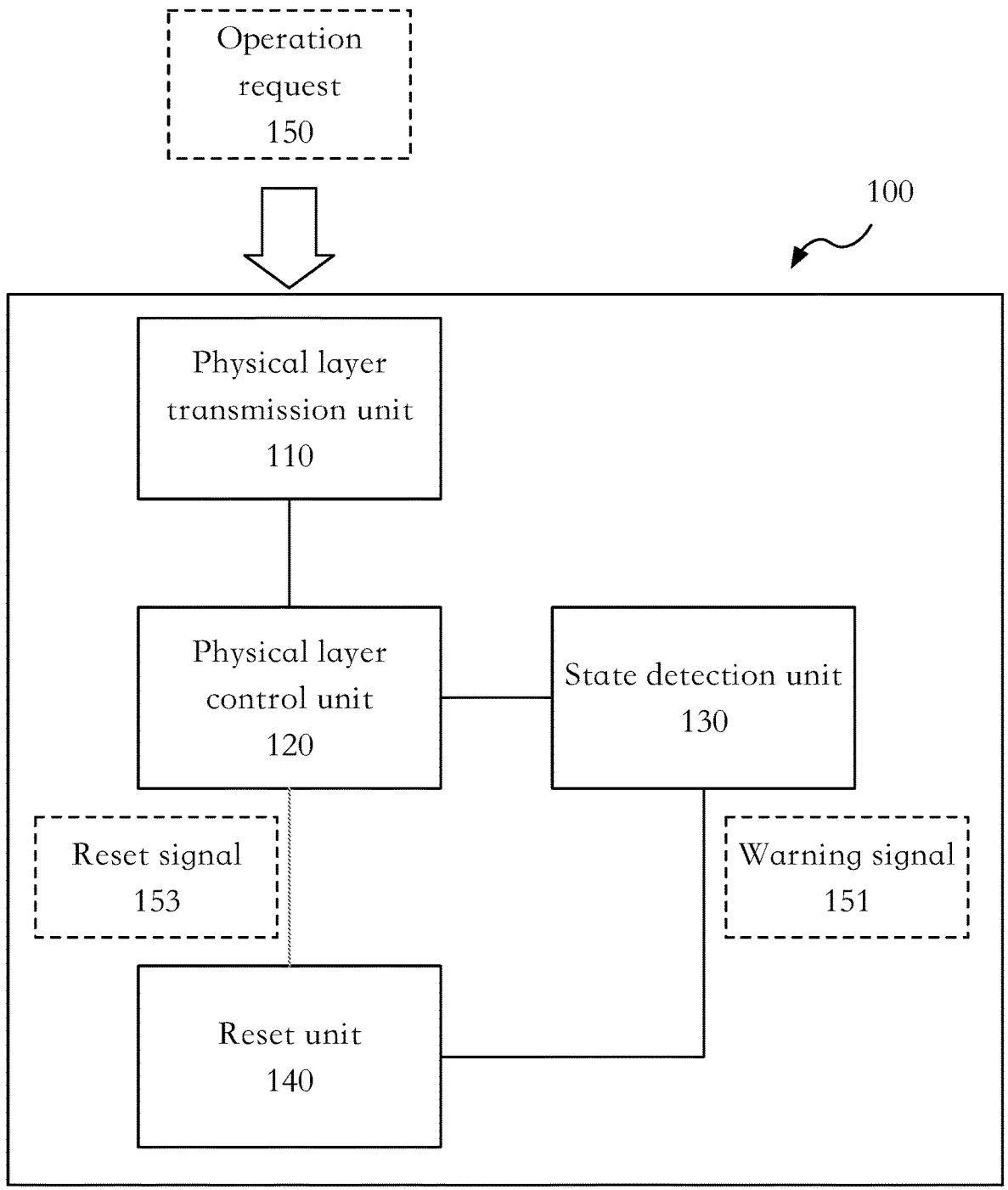
FIG. 1 illustrates a schematic circuit diagram of a processing circuit for anomaly detection according to an exemplary embodiment of the instant disclosure.

Please refer to FIG. 1. FIG. 1 illustrates a schematic circuit diagram of a processing circuit for anomaly detection according to an exemplary embodiment of the instant disclosure. The processing circuit for anomaly detection 100 (referred to as the processing circuit 100 hereinafter) comprises a physical layer (PHY) transmission unit 110, a physical layer control unit 120, a state detection unit 130, and a reset unit 140. The physical layer control unit 120 is connected to the physical layer transmission unit 110, the state detection unit 130, and the reset unit 140. The processing circuit 100 may be applied to network devices, universal serial buses (USBs), high-definition multimedia interface (HDMI), or other electronic devices having the physical layer control unit 120.

The physical layer transmission unit 110 is configured to receive an operation request 151. The physical layer control unit 120 performs corresponding encoding or decoding according to the operation request 151. During operation, the physical layer control unit 120 switches from operating in one operation state to operating in another operation state according to the operation request 151 and environmental parameters. The environmental parameters are information related to the environment in which the processing circuit 100 is currently operating. The switching of operation states of the physical layer control unit 120 will be illustrated later.

The state detection unit 130 is connected to the physical layer control unit 120 and the reset unit 140. The state detection unit 130 is configured to detect a current operation state of the physical layer control unit 120 and determines if the current operation state is erroneous. If the current operation state of the physical layer control unit 120 is erroneous, the state detection unit 130 drives the reset unit 140 to reset the physical layer control unit 120 to an initial state 161.

Figure 2:
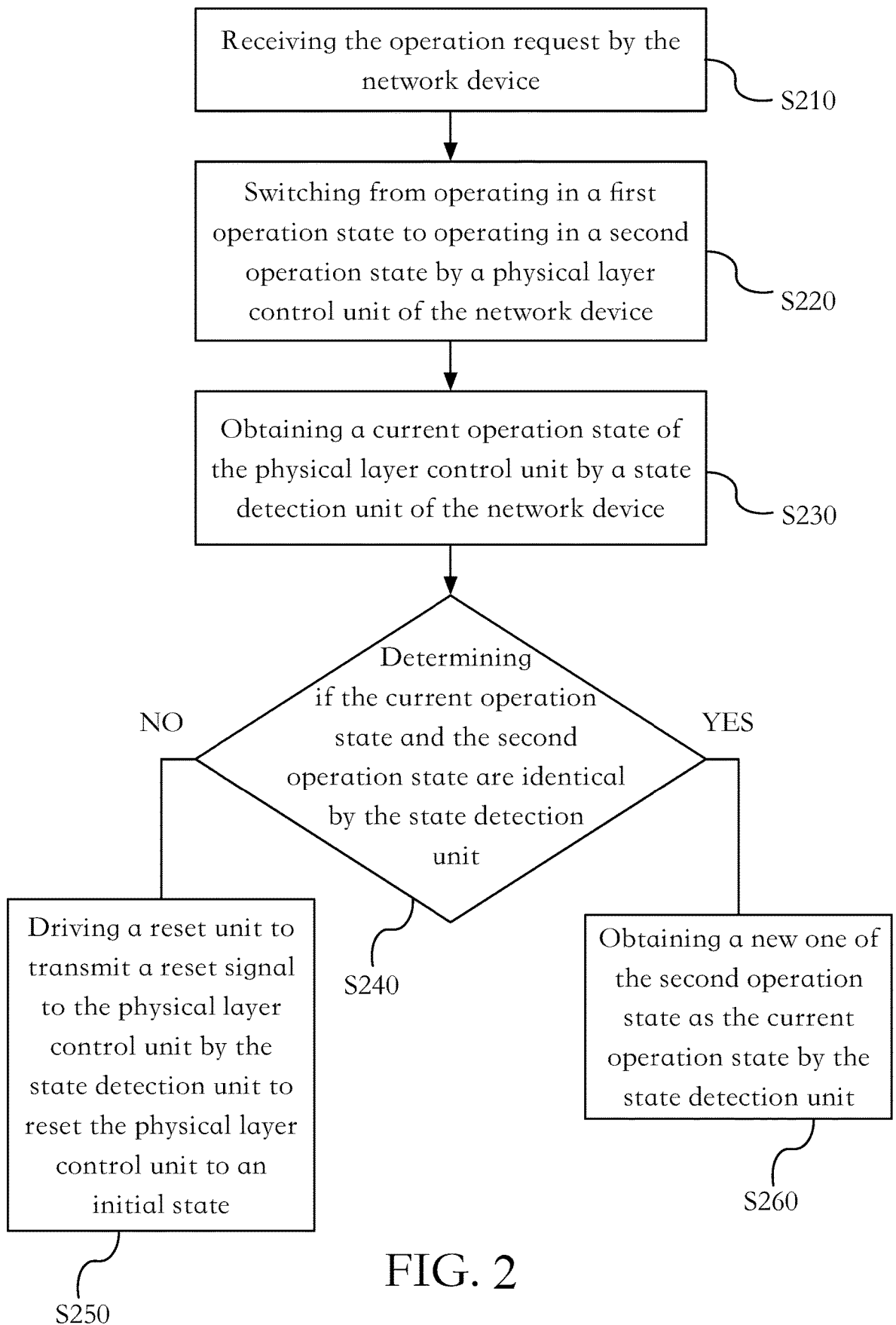
FIG. 2 illustrates a flowchart of a processing method for anomaly detection according to an exemplary embodiment of the instant disclosure.

Please refer to FIG. 2 for further illustration of the processing procedure of anomaly detection. FIG. 2 illustrates a flowchart of a processing method for anomaly detection according to an exemplary embodiment of the instant disclosure. Here, a network device having the aforementioned processing circuit 100 is taken as an example for illustrative purposes. The processing method for anomaly detection comprises the following steps:

Step S210: the network device receives the operation request;

Step S220: the physical layer control unit of the network device switches from operating in a first operation state to operating in a second operation state;

Step S230: the state detection unit of the network device obtains a current operation state of the physical layer control unit;

Step S240: the state detection unit determines if the current operation state and the second operation state are identical;

Step S250: the state detection unit drives a reset unit to transmit a reset signal to the physical layer control unit to reset the physical layer control unit to an initial state if the current operation state and the second operation state are not identical; and Step S260: the state detection unit obtains the current operation state again according to the current operation state if the current operation state and the second operation state are identical.

Figure 3:
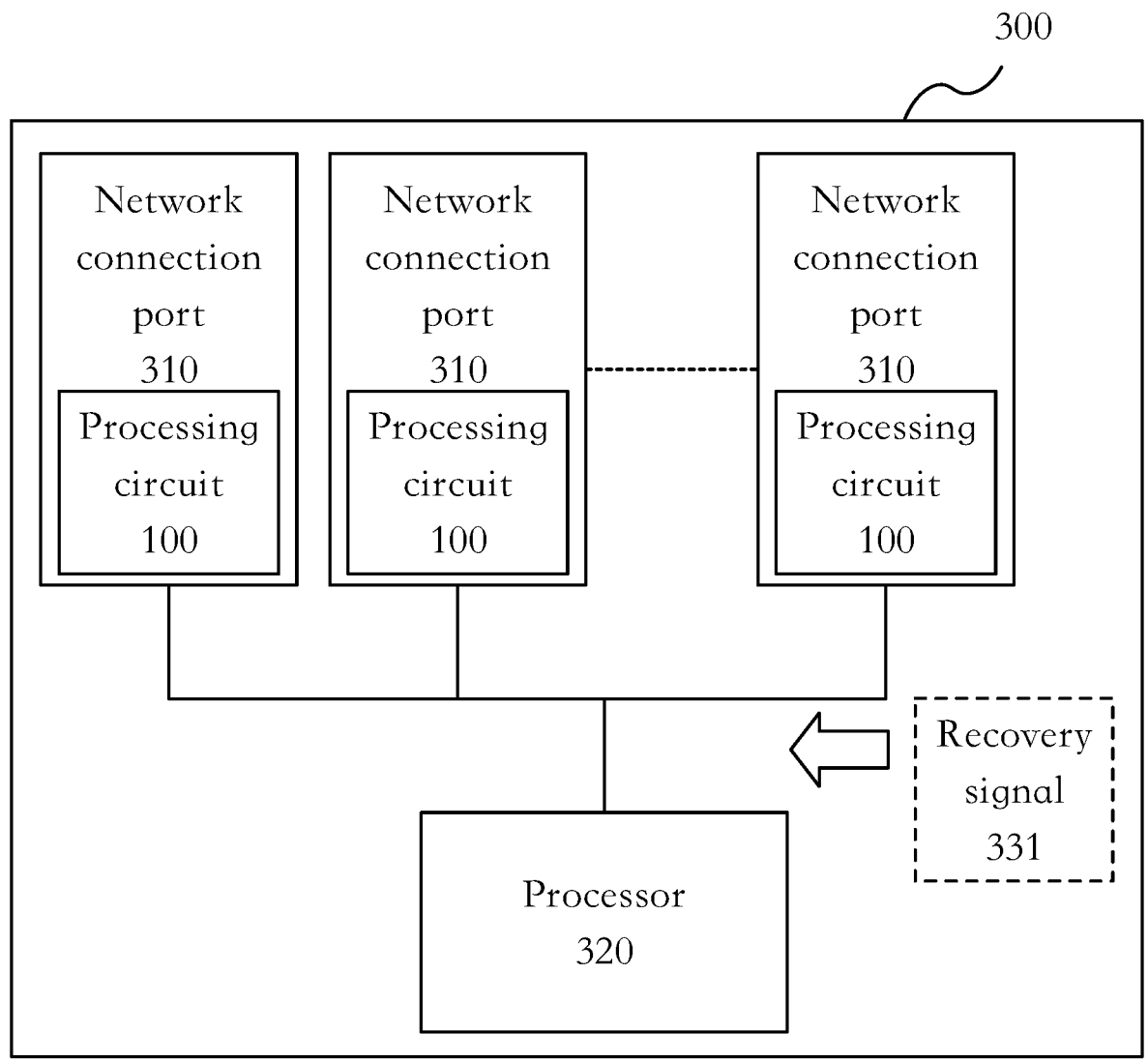
FIG. 3 illustrates a schematic circuit diagram of a network device and a processing circuit according to an exemplary embodiment of the instant disclosure.

First, the network device 300 having the processing circuit 100 is connected to a network, which may be an internet or an intranet. Please refer to FIG. 3. FIG. 3 illustrates a schematic circuit diagram of a network device and a processing circuit according to an exemplary embodiment of the instant disclosure. The network device 300 comprises at least one network connection port 310 and a processor 320, and each of the at least one network connection port 310 is connected to the same processing circuit 100, as shown in FIG. 3.

When the network connection port 310 is connected to the network, the physical layer transmission unit 110 will perform network packet transmission. The physical layer control unit 120 obtains the operation requests 151 within the network packets. In general, the operation request 151 is a processing request on a physical layer or a data link layer. For example, when the network device 300 is connected to a backbone network, the network device 300 will detect a type of communication protocol of the backbone network. The communication protocol may be 100 Mbps Ethernet or gigabit Ethernet. The content of the operation request 151 varies according to the type of communication protocol applied. For example, the operation request 151 under gigabit Ethernet is different from the operation request 151 under 100 Mbps Ethernet.

Figure 4:
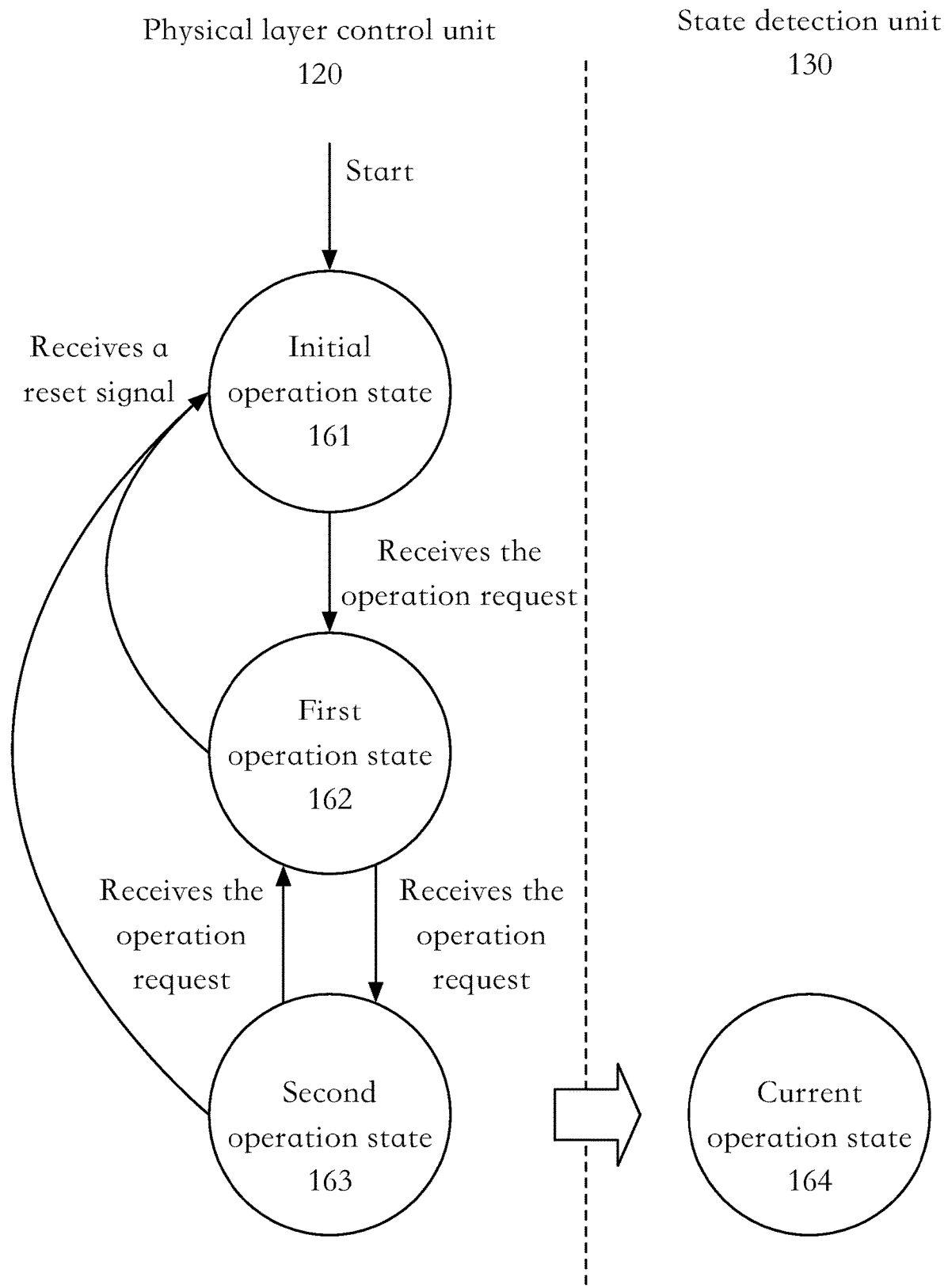
FIG. 4 illustrates a schematic diagram showing the state switching of a finite-state machine of an initial state, a first operation state, and a second operation state according to an exemplary embodiment of the instant disclosure.

To illustrate different operation states of the processing circuit 100, in this exemplary embodiment, various operation states are defined as the following: an initial state 161, a first operation state 162, a second operation state 163, a current operation state 164, and a default operation state (not labelled). Please refer to FIG. 4. FIG. 4 illustrates a schematic diagram showing the state switching of a finite-state machine (FSM, or finite-state automaton, FSA) of an initial state, a first operation state, and a second operation state according to an exemplary embodiment of the instant disclosure.

The initial state 161 refers to the operation state of the physical layer control unit 120 when the processing circuit 100 is connected to the network, or the operation state of the physical layer control unit 120 after the processing circuit 100 resets the physical layer control unit 120. The first operation state 162 refers to the operation state of the physical layer control unit 120 when the physical layer control unit 120 is processing the operation request 151. When the physical layer control unit 120 obtains a new operation request 151, the physical layer control unit 120 switches from operating in the first operation state 162 to operating in the second operation state 163 according to the new operation request 151 and the environmental parameters. Please refer to the FSM shown in FIG. 4 for the switching between the first operation state 162 and the second operation state 163.

In other words, in this exemplary embodiment, when the physical layer control unit 120 is processing the operation request 151, the physical layer control unit 120 is considered to be operating in the first operation state 162. When the physical layer control unit 120 obtains a new operation request 151 while operating in the first operation state 162, the physical layer control unit 120 switches from operating in the first operate state 162 to operating in the second operation state 163. The switching described here may be considered to be in the same round.

After the operation state is switched, in the new round, the operation state which was previously considered the second operation state 163 can now be considered the first operation state 162 of the new round, as shown in the FSM shown in FIG. 4. The current operation state 164 refers to the operation state of the physical layer transmission unit 110 obtained by the state detection unit 130. The state detection unit 130 reads a register of the physical layer control unit 120 in a real-time, periodically or time-sharing manner so as to obtain the operation state of the physical control layer 120. For example, the register of the physical layer control unit 120 stores codes related to the operation request 151, and the state detection unit 130 may identify the operation state of the physical layer control unit 120 through said codes.

When the physical layer control unit 120 is under the first operation state 162, the state detection unit 130 obtains information related to the first operation state 162. The content and operation of said information will be illustrated later. The state detection unit 130 obtains at least one default operation state of the physical layer control unit 120 according to the first operation state 162. Because the environmental parameters of the processing circuit 100 varies, the first operation state 162 may be selected from different operation states according to different environmental parameters. Here, these operation states that can be selected are called the default operation states. After the physical layer control unit 120 obtains the operation request 151, the physical layer control unit 120 will select one from the default operation states, and the selected default operation state will be considered the second operation state 163. In the meantime, the state detection unit 130 will obtain the corresponding default operation state according to the first operation state 162.

Next, the state detection unit 130 detects the current operation state 164 of the physical layer control unit 120 and determines whether the current operation state 164 and the second operation state 163, which can be considered a prediction for the current operation 164, are identical. If the current operation state 164 and the second operation state 163 are identical, the state detection unit 130 continues to execute the steps S210~S240. If the current operation state 164 and the second operation state 163 are not identical, the state detection unit 130 outputs a warning signal 152 to the reset unit 140. When the reset unit 140 obtains the waning signal 152, the reset unit transmits a reset signal 153 to the physical layer control unit 120 according to the warning signal 152 to reset the physical layer control unit 120 to the initial state 161.

In general, when the physical layer control unit 120 obtains the operation request 151, the physical layer control unit 120 switches from operating in the first operation state 162 to operating in the second operation state 163. However, when an error occurs at the physical layer control unit 120, the physical layer control unit 120 will not update or write erroneous data into the register. For example, when the state detection unit 130 detects that the current operation state 164 of the physical layer control unit 120 remains to be the first operation state 162, the state detection unit 130 determines that the current operation state 164 and the second operation state 163 are not identical, and thus the state detection unit 130 considers this result as an error and outputs the reset signal 153.

As a result, the state detection unit 130 will drive the reset unit 140 to reset the physical layer control unit 120 to the initial state 161. Alternatively, in some embodiments, the physical layer control unit 120 may be interfered by statics or other external interferences, so that the content stored in the register of the physical layer control unit 120 is changed. In this case, the state detection unit 130 will also determine that the current operation state 164 and the second operation state 163 are not identical.

Figure 5:
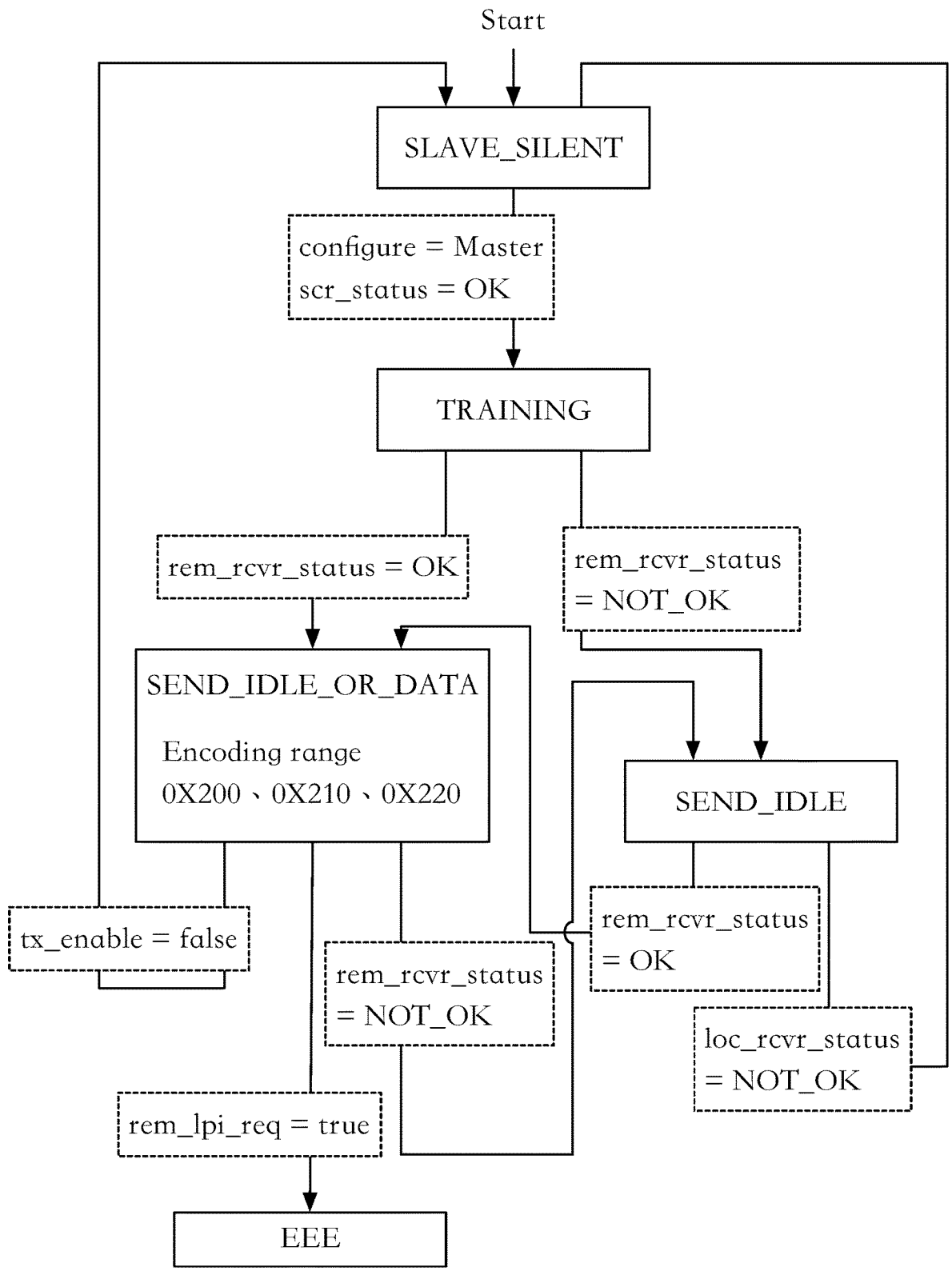
FIG. 5 illustrates a simplified schematic diagram of the determination of whether the network device supports power saving mode in a finite-state machine.

In an exemplary embodiment, the state detection unit 130 obtains the second operation state 163 related to the first operation state 162 of the physical layer control unit 120. The state detection unit 130 compares all of the second operation states 163 with the current operation state 164 and determines whether the second operation state 163 and the current operation state 164 are identical. Take the network device 300 as an example, during the transmission of network packets, corresponding operation states will be dynamically selected according to the environmental parameters. Please refer to FIG. 5. FIG. 5 illustrates a simplified schematic diagram of the determination of whether the network device supports power saving mode in a finite-state machine.

When the network device 300 is connect to a network, the network device 300 will perform a handshake, which roughly comprises the operation states shown in FIG. 5. These operation states include "SLAVE_SILENT," "TRAINING," "SEND_IDLE_OR_DATA," "SEND_IDLE," and "EEE (energy-efficient Ethernet)." Each of the operation states (each of the solid-lined blocks) has its own encoding range; the encoding range shown in FIG. 5 is only an illustrative example. Each of the dotted-lined blocks between two operation states is a conditional content of an operation request 151. For the current operation state 164, when the operation request 151 obtained by the network device 300 is identical to an obtained condition content, the network device 300 switches from operating in a first operation state 162 to operating in the second operation state 163.

Take the state "SEND_IDLE_OR_DATA" as an example, if the network device 300 obtains the operation request 151 "tx_enable=false," the physical layer control unit 120 switches from operating in the first operation state 162 "SLAVE_SILENT" to operating in the second operation state 163 "SLAVE_SILENT." Afterwards, the physical layer control unit 120 considers "SLAVE_SILENT" the first operation state 162 of the new round.

If the physical layer control unit 120 is operating in the first operation state 162 "SEND_IDLE_OR_DATA," the state detection unit 130 may obtain a code (i.e., the aforementioned encoding range) corresponding to the first operation state 162. Let the state "SEND_IDLE_OR_DATA" 510 have the following codes: "0X200," "0X201" and "0X202." The three codes are available states for the next round of the state "SEND_IDLE_OR_DATA" 510. In other words, "0X200" may correspond to "SLAVE_SILENT," "0X201" may correspond to "EEE," and "0X202" may correspond to "SEND_IDLE." The three output states may be considered the default operation states of the state "SEND_IDLE_OR_DATA" 510. In practice, the states and codes of the encoding range are not limited to the abovementioned codes or amount of codes.

The state detection unit 130 then obtains the second operation state 163 according to the encoding range, i.e., the operation states connected to the state "SEND_IDLE_OR_DATA" 510 (i.e., the first operation state 162). If the physical layer control unit 120 obtains the operation request 151 "rem_lpi_req=true," the physical layer 120 will normally switch to operating in the second operation state 163 "EEE (0X201)." The state detection unit 130 obtains the second operation state 163 and the current operation state 164 from the aforementioned codes and the physical layer control unit 120, respectively, and determines whether the second operation state 163 and the current operation state 164 are identical.

If an error occurs at the physical layer control unit 120 after the physical layer control unit 120 obtains the operation request 151 "rem_lpi_req=true," the codes stored in the register of the physical layer control unit 120 is erroneous. As a result, the state detection unit 130 determines that the second operation state 163 and the current operation state 164 are not identical. The state detection unit 130 then drives the reset unit 140 to transmit the reset signal 153 to the physical layer control unit 120. When the physical layer control unit 120 enters the initial state 161, the physical layer control unit 120 transmits a recovery signal 331 to the processor 320 so as to inform the processor 320, as shown in FIG. 3. The processor 320 records the operation state of each of the at least one network connection port 310 according to the recovery signal 331 of each of the at least one network connection port 310.

If the current operation state 164 and the second operation state 163 are identical, the state detection unit 130 obtains a new second operation state 163 as the current operation state 164. Because the current operation state 164 in the previous round has become the first operation state 162 of the new round, the state detection unit 130 can obtain the second operation state 163 of the new round, i.e., the new second operation state 163, according to the first operation state 162 of the new round, i.e., the new first operation state 162.

Figure 6:
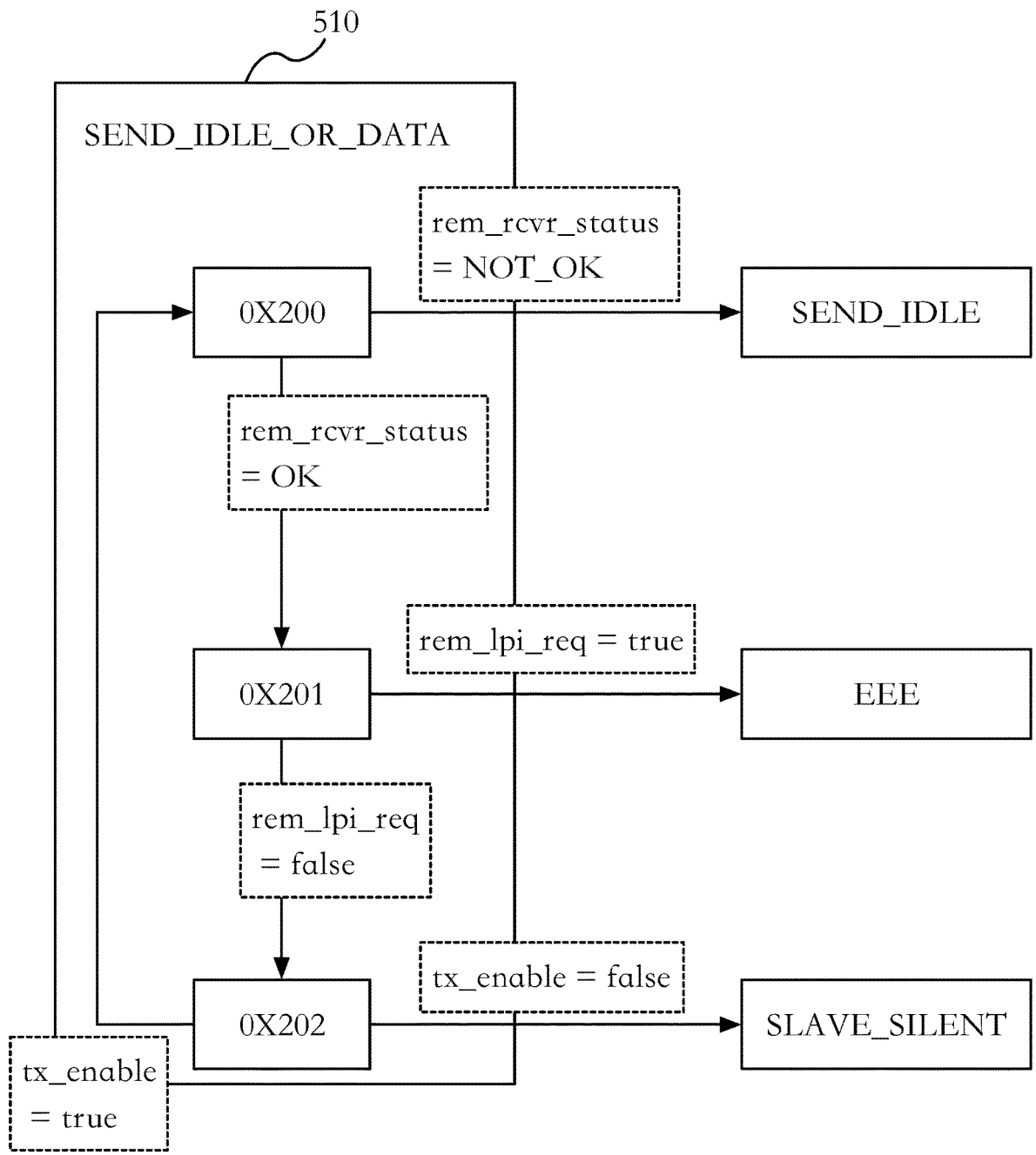
FIG. 6 illustrates a detailed schematic diagram of state switching of the "SEND_IDLE_OR_DATA" block of FIG. 5 according to an exemplary embodiment of the instant disclosure.

In addition to the situation where the aforementioned three output states may be considered the default operation states of the state "SEND_IDLE_OR_DATA" 510, the state detection unit 130 may also consider an internal switching of the state "SEND_IDLE_OR_DATA" 510 as the second operation state 163. As illustrated previously, the state "SEND_IDLE_OR_DATA" 510 includes "0X200," "0X201," and "0X202," but "0X200," "0X201," and "0X202," are interchangeable. Please refer to FIG. 6. FIG. 6 illustrates a detailed schematic diagram of state switching of "SEND_IDLE_OR_DATA" block of FIG. 5 according to an exemplary embodiment of the instant disclosure. In other words, the state detection unit 130 can not only detect various operation states but also obtain default operation states corresponding to sub-states (i.e., the aforementioned internal states) of a single operation state.

Further, the codes and the amount of codes of the coding range of the operation states are not limited to the aforementioned codes and amounts. For example, let the state "SEND_IDLE_OR_DATA" 510 include 20 states such as presented by the code "0X200" through the code "0X214," which are for illustrative purposes and thus not described in detail. After the physical layer control unit 120 obtains the operation request 151 "rem_lpi_req=true," an error occurs at the physical layer control unit 120, making the code stored in the register of the physical layer control unit 120 not belong in the range of "0X200" to "0X214" (for example, the code stored in the register of the physical layer control unit 120 belongs to "0x000" through "0x1FF" or "0x220"). As a result, the state detection unit 130 determines that the second operation state 163 and the current operation state 164 are not identical. The state detection unit 130 then drives the reset unit 140 to transmit the reset signal 153 to the physical layer control unit 120. Besides, when the first operation state 162 and the second operation state 163 are identical, the state detection unit 130 also considers the second operation state 163 and the current operation state 164 not identical.

According to one or some exemplary embodiments of the present disclosure, the processing circuit 100, network device 300, and processing method for anomaly detection can monitor the operation state of each of the different physical layer control units 120. When an error occurs at one of the physical layer control units 120, a corresponding state detection unit 130 and a corresponding reset unit 140 reset the physical layer control unit 120 to the initial state 161. The processing circuit 100 may also be applied to other electronic devices having a physical layer transmission unit 110 and a physical layer control unit 120.

What is claimed is:

1. A processing circuit for anomaly detection comprising:
    a physical layer transmission unit configured to receive an operation request;
    a physical layer control unit connected to the physical layer transmission unit, wherein the physical layer control unit switches from operating in a first operation state to operating in a second operation state according to the operation request;
    a state detection unit connected to the physical layer control unit, wherein the state detection unit is configured to detect a current operation state of the physical layer control unit, and the state detection unit outputs a warning signal when the current operation state and the second operation state are not identical; and
    a reset unit connected to the physical layer control unit and the state detection unit, wherein the reset unit transmits a reset signal to the physical layer control unit according to the warning signal to reset the physical layer control unit to an initial state.

2. The processing circuit according to claim 1, wherein the state detection unit periodically detects the current operation state of the physical layer control unit.

3. The processing circuit according to claim 1, wherein the state detection unit obtains at least one default operation state of the physical layer control unit according to the first operation state, and the physical layer control unit selects one of the at least one default operation state as the second operation state according to the operation request.

4. A network device for anomaly detection comprising:
    at least one network connection port, wherein:
        each of the at least one network connection port comprises a physical layer transmission unit, a physical layer control unit, a state detection unit, and a reset unit;
        the physical layer control unit is connected to the physical layer transmission unit, the state detection unit, and the reset unit;
        the physical layer transmission unit is configured to receive an operation request;
        the physical layer control unit switches from operating in a first operation state to operating in a second operation state according to the operation request;
        the state detection unit is configured to detect a current operation state of the physical layer control unit; and
        when the state detection unit determines that the current operation state and the second operation state are not identical, the state detection unit drives the reset unit to transmit a reset signal to the physical layer control unit to reset the physical layer control unit to an initial state; and a processor connected to the at least one network connection port, wherein the processor records an error record of a corresponding one of the at least one network connection port according to the reset signal.

5. The network device according to claim 4, wherein the state detection unit obtains at least one default operation state of the physical layer control unit according to the first operation state, and the physical layer control unit selects one of the at least one default operation state as the second operation state according to the operation request.

6. The network device according to claim 4, further comprising a storage unit connected to the processor, wherein the storage unit stores the error record of each of the at least one network connection port.

7. A processing method for anomaly detection comprising:

receiving an operation request by a network device;

switching from operating in a first operation state to operating in a second operation state by a physical layer control unit of the network device according to the operation request;

obtaining a current operation state of the physical layer control unit by a state detection unit of the network device;

determining if the current operation state and the second operation state are identical by the state detection unit; and driving a reset unit to transmit a reset signal to the physical layer control unit by the state detection unit to reset the physical layer control unit to an initial state if the current operation state and the second operation state are not identical.

8. The processing method according to claim 7, wherein a step after the step of determining if the current operation state and the second operation state are identical by the state detection unit is: obtaining a new one of the second operation state as the current operation state by the state detection unit if the current operation state and the second operation state are identical.

9. The processing method according to claim 8, wherein a step after the step of driving the reset unit to transmit the reset signal to the physical layer control unit by the state detection unit to reset the physical layer control unit to an initial state is: transmitting a recovery signal to a processor by the physical layer control unit during the initial state.

* * * * *